(12) United States Patent
Schechter et al.

(10) Patent No.: US 11,403,308 B2
(45) Date of Patent: *Aug. 2, 2022

(54) PROCESSING DATA FROM MULTIPLE SOURCES

(71) Applicant: Ab Initio Technology LLC, Lexington, MA (US)

(72) Inventors: Ian Schechter, Sharon, MA (US); Tim Wakeling, Andover, MA (US); Ann M. Wollrath, Groton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/865,975

(22) Filed: May 4, 2020

(65) Prior Publication Data
US 2020/0265047 A1    Aug. 20, 2020

Related U.S. Application Data

(63) Continuation of application No. 15/431,984, filed on Feb. 14, 2017, now Pat. No. 10,642,850, which is a
(Continued)

(51) Int. Cl.
*G06F 16/28* (2019.01)
*G06F 16/2458* (2019.01)
(Continued)

(52) U.S. Cl.
CPC ........ *G06F 16/2471* (2019.01); *G06F 9/5066* (2013.01); *G06F 16/13* (2019.01);
(Continued)

(58) Field of Classification Search
CPC ...... G06F 9/5066; G06F 16/13; G06F 16/254; G06F 16/1734; G06F 16/9024;
(Continued)

(56) References Cited

U.S. PATENT DOCUMENTS 5,226,159 A    7/1993  Henson et al.
5,897,638 A    4/1999  Lasser et al.
(Continued)

FOREIGN PATENT DOCUMENTS

WO    WO 2012151149    11/2012

OTHER PUBLICATIONS

"Connectors for Apache Hadoop and non-Microsof Business Intelligence and ETL Products" Microsoft SQL Server 2008 R2—Parallel Data Warehouse (Dec. 2011).
(Continued)

*Primary Examiner* — Merilyn P Nguyen
(74) *Attorney, Agent, or Firm* — Fish & Richardson P.C.

(57) ABSTRACT

In a first aspect, a method includes, at a node of a Hadoop cluster, the node storing a first portion of data in HDFS data storage, executing a first instance of a data processing engine capable of receiving data from a data source external to the Hadoop cluster, receiving a computer-executable program by the data processing engine, executing at least part of the program by the first instance of the data processing engine, receiving, by the data processing engine, a second portion of data from the external data source, storing the second portion of data other than in HDFS storage, and performing, by the data processing engine, a data processing operation identified by the program using at least the first portion of data and the second portion of data.

15 Claims, 4 Drawing Sheets

Related U.S. Application Data continuation of application No. 14/255,579, filed on Apr. 17, 2014, now Pat. No. 9,607,073.

(51) Int. Cl.
*G06F 16/13* (2019.01)
*G06F 16/25* (2019.01)
*G06F 16/17* (2019.01)
*G06F 16/901* (2019.01)
*G06F 9/50* (2006.01)

(52) U.S. Cl.
CPC ........ *G06F 16/1734* (2019.01); *G06F 16/254* (2019.01); *G06F 16/285* (2019.01); *G06F 16/9024* (2019.01); *G06F 16/284* (2019.01)

(58) Field of Classification Search
CPC .... G06F 16/2471; G06F 16/285; G06F 8/433; G06F 3/0631; G06F 11/0709; G06F 16/2455; G06F 16/284
See application file for complete search history.

(56) References Cited

U.S. PATENT DOCUMENTS

| | | | |
|---|---|---|---|
| 5,966,072 A | 10/1999 | Stanfill et al. | |
| 6,389,420 B1 | 5/2002 | Vahalia et al. | |
| 6,446,070 B1 | 9/2002 | Arnold et al. | |
| 7,210,148 B2 | 4/2007 | Arnold et al. | |
| 7,315,926 B2 | 1/2008 | Fridella et al. | |
| 7,716,630 B2 | 5/2010 | Wholey et al. | |
| 7,962,779 B2 | 6/2011 | Patel et al. | |
| 8,356,050 B1 | 1/2013 | Olston et al. | |
| 8,918,388 B1 | 12/2014 | Chen | |
| 9,158,843 B1 | 10/2015 | Florissi et al. | |
| 9,679,041 B2 | 6/2017 | Aasnnan et al. | |
| 10,061,858 B2 * | 8/2018 | Park | G06F 16/955 |
| 10,169,083 B1 | 1/2019 | Florissi et al. | |
| 10,191,948 B2 | 1/2019 | Vennuri et al. | |
| 2003/0081790 A1 | 5/2003 | Kallahalla et al. | |
| 2005/0144186 A1 | 6/2005 | Hesselink et al. | |
| 2007/0011668 A1 * | 1/2007 | Wholey | G06F 8/34 717/113 |
| 2011/0027692 A1 | 2/2011 | Sugitani et al. | |
| 2011/0066602 A1 * | 3/2011 | Studer | G06F 16/284 707/690 |
| 2011/0145748 A1 * | 6/2011 | Farver | G06F 8/71 715/771 |
| 2011/0173410 A1 | 7/2011 | Castillo et al. | |
| 2011/0276962 A1 | 11/2011 | Chambers et al. | |
| 2011/0302583 A1 | 12/2011 | Abadi et al. | |
| 2012/0054255 A1 * | 3/2012 | Buxbaum | G06F 9/50 708/235 |
| 2012/0239612 A1 | 9/2012 | George et al. | |
| 2013/0024496 A1 | 1/2013 | Krishnan et al. | |
| 2013/0198120 A1 | 8/2013 | Vezina | |
| 2013/0204948 A1 | 8/2013 | Zeyliger et al. | |
| 2013/0227558 A1 | 8/2013 | Du et al. | |
| 2013/0254196 A1 | 9/2013 | Babu et al. | |
| 2013/0325814 A1 | 12/2013 | Carter | |
| 2013/0346988 A1 | 12/2013 | Bruno et al. | |
| 2014/0047422 A1 | 2/2014 | Ravi et al. | |
| 2014/0095470 A1 | 4/2014 | Chen et al. | |
| 2014/0115560 A1 | 4/2014 | Hutchison | |
| 2014/0280032 A1 | 9/2014 | Kornacker | |
| 2014/0281748 A1 | 9/2014 | Ercegovac | |
| 2014/0282605 A1 * | 9/2014 | Jacobson | G06F 9/5066 718/107 |
| 2014/0304545 A1 | 10/2014 | Chen et al. | |
| 2014/0304549 A1 | 10/2014 | Hsu et al. | |
| 2014/0342714 A1 | 11/2014 | Sanders | |
| 2015/0074151 A1 | 3/2015 | Chaiken et al. | |
| 2015/0127649 A1 | 5/2015 | Felch | |
| 2015/0149503 A1 | 5/2015 | Wollrath et al. | |
| 2015/0234896 A1 * | 8/2015 | Dageville | G06F 16/2365 707/714 |

OTHER PUBLICATIONS

"DistCp Version 2 Guide" The Apache Software Foundation, pp. 1-12 (2008).
"Hadoop Streaming" The Apache Software Foundation, pp. 1-18 (2008).
"MapReduce Tutorial" The Apache Software Foundation, pp. 1-42 (2008).
Amr Awadallah, "Introducing Apache Hadoop: The Modern Data Operating System" Stanford EE380 Computer Systems Colloquium, pp. 1-30 (Nov. 2011).
Andrew Brust, "Microsoft's PolyBase mashes up SQL Server and Hadoop" ZDNet: Big on Data (Nov. 2012).
Daniel Abadi, "Why Database-to-Hadoop Connectors are Fundamentally Flawed and Entirely Unnecessary" Hadapt,(Jul. 2012).
Dhruba Borthakur, "The Hadoop Distributed File System: Architecture and Design" The Apache Software Foundation, pp. 1-14 (2007).
Gates et al. "Building a high-level dataflow system on top of Map-Reduce: the Pig experience," Proceedings of the VLDB Endowment, Aug. 1, 2009, 2(2):1414-25.
Hartman et al., "The Zebra Striped Network File System," Operating Systems Review, vol. 27, No. 5, pp. 29-43 (1993).
International Preliminary Report on Patentability in PCT/US2015/026088, dated Oct. 18, 2016.
International Search Report and Written Opinion, PCT/US2014/066781, dated Mar. 16, 2015 (10 pages).
International Search Report and Written Opinion, PCT/US2015/026088, dated Jul. 3, 2015 (18 pages).
JP Office Action in Japanese Appln. No. 2016-562015, dated Feb. 28, 2019, 16 pages.
Lay et al. "Leveraging Massively Parallel Processing in an Oracle Environment for Big Data Analytics" Oracle White Paper, pp. 1-9 (Nov. 2010).
Nam-Luc Tran, Sabri Skhiri, Arthur Lesuisse, and Esteban Zinn'anyi AROM: Processing Big Data With Data Flow Graphs and Functional Programming, pp. 875-882. (Year: 2012).
Shankar et al. "In-Database Map-Reduce" Oracle White Paper, pp. 1-15 (Oct. 2009).
Shankar et al. "Integrating Hadoop Data with Oracle Parallel Processing" Oracle White Paper, pp. 1-20 (Jan. 2010).
Shvachko et al. "The Hadoop Distributed File System", Proc. 26th IEEE Symp. Mass Storage Syst. Technol., pp. 1-11 (2010).
Stephen Sorkin, "Large-Scale, Unstructured Data Retrieval and Analysis Using Splunk" Splunk Inc., pp. 1-7 (2011).
Office Action in Australian Appln. No. 2020203145, dated Feb. 1, 2022, 4 pages.
Office Action in Canadian Appln No. 2,946,118, dated Apr. 30, 2021, 4 pages.

* cited by examiner

PROCESSING DATA FROM MULTIPLE SOURCES

CLAIM OF PRIORITY

This application is a continuation of U.S. patent application Ser. No. 15/431,984, filed on Feb. 14, 2017, which is a continuation of U.S. patent application Ser. No. 14/255,579, filed on Apr. 17, 2014, the entire contents which are hereby incorporated by reference.

BACKGROUND

This description relates to processing data from multiple sources. Data can be stored in a variety of sources, including, for example, an HDFS (Hadoop Distributed File System) cluster. A data processing system can perform operations on data received from an HDFS cluster and also data received from other types of sources.

SUMMARY

In a first aspect, a method includes, at a node of a Hadoop cluster, the node storing a first portion of data in HDFS data storage, executing a first instance of a data processing engine capable of receiving data from a data source external to the Hadoop cluster, receiving a computer-executable program by the data processing engine, executing at least part of the program by the first instance of the data processing engine, receiving, by the data processing engine, a second portion of data from the external data source, storing the second portion of data other than in HDFS storage, and performing, by the data processing engine, a data processing operation identified by the program using at least the first portion of data and the second portion of data.

In a second aspect, a method includes, at a node storing a first portion of data and operating in conjunction with a cluster of nodes, the cluster storing an aggregation of data that can be operated on in parallel, executing a first instance of a data processing engine capable of receiving data from a data source external to the cluster, receiving a computer-executable program by the data processing engine, executing at least part of the program by the first instance of the data processing engine, receiving, by the data processing engine, a second portion of data from the external data source, storing the second portion of data in volatile memory of the node, and performing, by the data processing engine, a data processing operation identified by the program using at least the first portion of data and the second portion of data.

In a third aspect according to the first or second aspect, the Hadoop cluster includes nodes each executing an instance of the data processing engine, the instances of the data processing engine running concurrently to perform the data processing operation together in parallel on a) a first body of data that includes the first portion of data, the first body of data also including other portions of data being processed by the other nodes of the Hadoop cluster, and b) a second body of data that includes the second portion of data, the second body of data being stored in a format native to a relational database system, and the second body of data being divided into portions that each can be stored in volatile memory of the nodes of the Hadoop cluster.

In a fourth aspect according to any of the first through third aspects, the computer program is a dataflow graph executed by a graph execution engine of the data processing engine, wherein the dataflow graph includes a) at least one component representing the Hadoop cluster, b) at least one component representing the source of the second portion of data, and c) at least one link that represents at least one dataflow associated with the operation to be performed on the data received from at least one source of data.

In a fifth aspect according to the fourth aspect, at least one component of the dataflow graph is connected to a link representing a flow of data from the Hadoop cluster, and wherein the at least one component is connected to a link representing a flow of data from the source of the second portion of data.

In a sixth aspect according to any of the first through fifth aspects, the data processing engine does not implement the MapReduce programming model.

In a seventh aspect according to any of the first through sixth aspects, the second portion of data is stored in volatile memory.

In an eighth aspect according to any of the first through seventh aspects, the method includes receiving a database query, the database query including at least one operation to be performed on data received from at least one source of data that includes the Hadoop cluster; and the computer program includes components representing operations corresponding to the database query, wherein the computer program includes at least one component representing the at least one source of data and at least one link that represents at least one dataflow associated with the operation to be performed on data received from at least one source of data.

In a ninth aspect according to any of the first through eighth aspects, the second portion of data was chosen based on characteristics of the first portion of data.

In a tenth aspect according to any of the first through ninth aspects, the second portion of data includes a subset of rows of a relational database, and the second portion of data includes a subset of columns of the relational database In an eleventh aspect according to any of the first through tenth aspects, the second portion of data is distinct from a third portion of data received at a second node of the Hadoop cluster from the external data source.

In a twelfth aspect according to any of the first through eleventh aspects, the method includes executing at least part of the program by a second instance of the data processing engine outside of the Hadoop cluster.

In a thirteenth aspect according to any of the first through twelfth aspects, the method includes communicating with at least part of the program being executed by a second instance of the data processing engine outside of the Hadoop cluster.

In a fourteenth aspect, a method includes, at a data processing engine of a node of a Hadoop cluster, performing a data processing operation identified by a computer-executable program being executed by the data processing engine, the data processing operation being performed using at least a first portion of data stored in HDFS data storage at the node and at least a second portion of data received from a data source external to the Hadoop cluster and stored other than in HDFS the storage.

In a fifteenth aspect, a method includes receiving a SQL query specifying sources of data including a Hadoop cluster and a relational database, generating a computer-executable program that corresponds to the SQL query, executing the computer-executable program at a data processing engine of a node of the Hadoop cluster, and performing, by the data processing engine, a data processing operation identified by the computer-executable program using at least data of the Hadoop cluster and data of the relational database.

One or more of the aspects, alone or in combination, may be represented as a system, or an apparatus, or as a computer readable storage device storing a computer program product including machine readable instructions that, when executed by a computer system, carry out operations of the aspect. As one example, a computer readable storage device can store a computer program product including machine readable instructions that, when executed by a computer system, carry out operations according to any one of the first through fifteenth aspects. As another example, a computer system including one or more processors can include a computer-readable storage device storing a computer program product that includes machine readable instructions that, when executed by the one or more processors, carry out operations according to any one of the first through fifteenth aspects.

One or more of the above aspects may provide the following advantages. First, a Hadoop node can operate on data stored in volatile memory, and need not write data to disk before performing operations on the data. Second, a Hadoop node can be configured to receive data from multiple types of data sources. Third, a Hadoop node can be configured to operate in association with a general-purpose data processing operating system, e.g., a data processing operating system not specific to Hadoop nodes. Fourth, a Hadoop node can be configured to operate with dataflow graphs that carry out data processing operations.

Other features and advantages of the invention will become apparent from the following description, and from the claims.

DESCRIPTION

Figure 1:
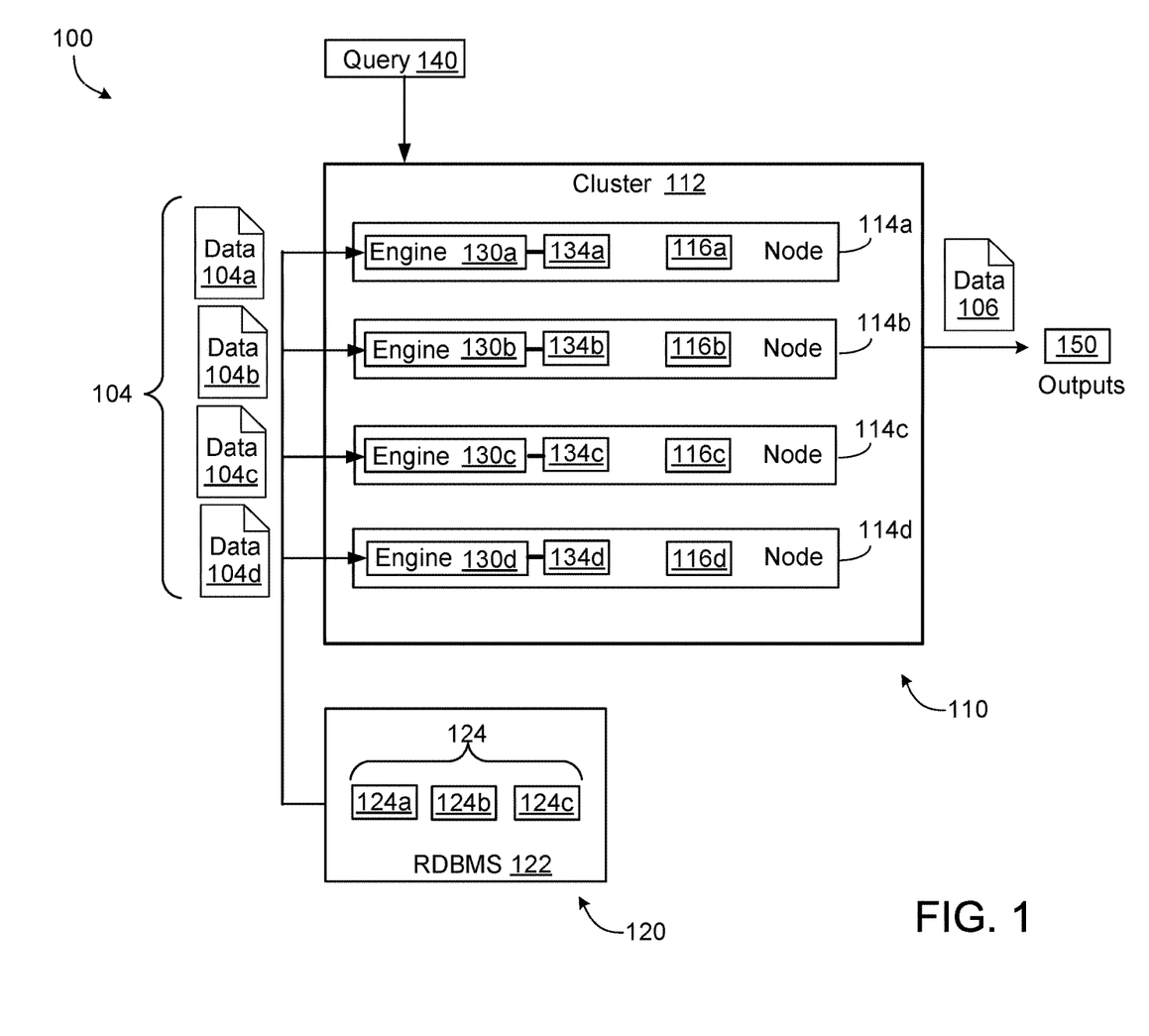
FIG. 1 shows a data processing system.

FIG. 1 shows a data processing system 100 in which data 116a-d originating at one type of data source 110 and data 104 originating at another type of data source 120 is processed and processed data 106 is provided to one or more outputs 150. The data can be processed in a way so that the operations performed on the data are not limited according to which data originated at which type of data source 110, 120. One manner for accomplishing this is enabling one of the data sources 110 to receive data 104 from the other data source 120 and process the received data 104 using techniques native to the data source 110. In this way, much of the data processing is performed by the data source 110. Data processing systems that process data from more than one type of data source are sometimes called federated data processing systems.

One type of data source 110 is a collection of files stored in a Hadoop Distributed File System (sometimes called HDFS) cluster. HDFS is a technique that defines a file system that can be used to distribute data across multiple computer systems that each store data in a manner that complies with the technique. An HDFS cluster, which we also refer to simply as a Hadoop cluster, is a collection of computer systems (sometimes called nodes) storing portions of data in a manner that allows a single operation to be carried out on the portions of data in parallel (e.g., substantially simultaneously). The data of each node is stored using a file system defined by the HDFS technique. The file system is sometimes referred to as HDFS storage. Generally, a file system operating according to HDFS can store any kind of data files. Sometimes a type of file specific to Hadoop, called a sequence file, is used as the file format for data stored in a Hadoop node. A Hadoop cluster could have dozens or hundreds of nodes (or more). In this way, a Hadoop cluster could carry out a single data processing operation across those dozens or hundreds of nodes in parallel, each node operating on a portion of data. As described below, techniques can be used to carry out most or all data processing operations on a Hadoop cluster rather than on a different data processing system that would otherwise perform the operations.

Although we generally describe a Hadoop node as a computer system storing a portion of data, a Hadoop node can take other forms. Any arrangement in which a particular portion of data is associated with a particular portion of computer hardware can be a Hadoop node. For example, a single Hadoop node itself could be made up of multiple computer systems, whether they be two or more computer systems operating together to form a node, two processors of a multiprocessor computer system operating together to form a node, or some other arrangement. A single computer system could also act as multiple Hadoop nodes if the single computer system had two distinct file systems operating according to the HDFS technique each with its own portion of data. Further, when we say that a node performs a particular action, we mean that the node serves as a platform on which a functional component carries out the described action. For example, a computer program executing on the node may be carrying out the action.

Further, although we reference the Hadoop technique in this description, other similar techniques that do not carry the Hadoop name, and/or do not use the HDFS data storage format, can be used with the techniques described here. In this way, these same techniques can be used with other types of clusters. For example, these techniques could be used with another kind of cluster that stores an aggregation of data that can be operated on in parallel by nodes operating in conjunction with one another to carry out a data processing operation on the aggregation of data (e.g., by splitting the aggregation of data into portions operated on by the individual nodes).

One way of processing data in a Hadoop cluster is using a MapReduce programming model. Generally, a MapReduce program includes a Map procedure that performs filtering and sorting (such as sorting university students by first name into queues, one queue for each name) and a Reduce procedure that performs a summary operation (such as counting the number of university students in the respective queues, yielding name frequencies). A user of the system specifies the Map and Reduce procedures, but does not necessarily determine the number of instances (or invocations) of each procedure (i.e., "processes") or the nodes on which they execute. Rather, a "MapReduce System" (also called "infrastructure", "framework") orchestrates by marshaling a set of distributed nodes, running the various tasks (e.g., the Map and Reduce procedures and associated communication) in parallel, managing all communications and data transfers between the various parts of the system, providing for redundancy and failures, and overall management of the whole process. A MapReduce system can schedule execution of instances of Map or Reduce procedures with an awareness of the data location.

The other data source 120 could be a data source such as a relational database (sometimes called a Relational Database Management System, or RDBMS), a flat file, a feed of data from a network resource, or any other resource that can provide data in response to a request from the data processing system. Data processing operations can be performed on combinations of data stored in the Hadoop cluster 112 and data 104 received from the other data source 120. Rather than use an independent processing system to extract data from the Hadoop cluster 112 and from the other data source 120, the data processing functionality of the Hadoop cluster 112 can be used to process the combination of the data 116*a-d* stored in the Hadoop cluster 112 and the data 104 received from the other data source 120. For example, this could be done to take advantage of data processing features of the Hadoop cluster 112. For example, as shown in FIG. 1, data 104 received from the other data source 120 is transmitted directly to the Hadoop cluster 112. Here, we will use the example of a relational database 122 as the other data source 120.

One way to combine the data for processing is to copy data 116*a-d* stored in nodes 114*a-d* of the Hadoop cluster 112 to the relational database. The relational database 122 can then be instructed to operate on the combined data, for example, using data processing operations native to the relational database 122 (e.g., database operations defined according to a query language such as SQL). However, in this technique, the parallel processing capabilities of the Hadoop cluster 112 are lost. One way to combine the data for processing is to copy most or all of the data 124*a-c* stored in the relational database 122 into the Hadoop cluster 112 and then process the data using techniques native to the Hadoop cluster 112, for example, using the MapReduce programming model described above.

Depending on the manner of implementation, either technique could require a potentially large amount of data to be copied from one data source to the other data source, which a) typically requires that at least some of the data be written to disk, b) typically requires a substantial amount of processing time to copy the data, as compared to the processing time required to perform the operation, and c) runs the risk that the copied data will become stale—i.e., the copied data will become out of date relative to its source, unless steps are taken to ensure that data does not change while the operation is being carried out. All of these limitations impact the performance and efficiency of either technique.

In another technique, most or all of the data can be stored in their respective native data sources 110, 120, such that only small amounts of data are copied from one data source to another. Put another way, data processing operations are carried out in a manner that uses techniques for utilizing the resources of both types of data sources 110, 120, rather than carrying out operations that utilize only one type of data source. As a practical example, the nodes 114*a-d* of the Hadoop cluster 112 can perform some operations (e.g., operations that perform a transformation upon a portion of data) needed to complete a task, and the relational database 122 can carry out some other operations (e.g., operations that perform a transformation upon another portion of data) also needed to complete the task.

As an example of these techniques, when the nodes 114*a-d* of the Hadoop cluster 112 perform a data processing operation, each node 114*a-d* accesses only the data it needs to carry out the operation, e.g., only the data on which the operation is performed. For example, some of the data may be stored in a database table having columns and rows. If a particular operation only applies to certain columns or rows then only those columns or rows are copied from one data source to another, e.g., from the relational database 122 to one of the nodes 114*a-d*. As a practical example, if a relational database 122 stores data representing customers of a telephone company, and the data processing system is performing an operation that requires a list of telephone numbers, then the nodes 114*a-d* access only the column of the relational database 122 that stores telephone numbers, and need not access columns representing customer names, addresses, or other data that may be stored in the database. The relational database 122 can perform operations necessary to return only the portions of the database needed for a particular operation, e.g., a particular operation carried out by a node 114*a-d* of the Hadoop cluster.

Further, individual nodes 114*a-d* of a Hadoop cluster 112 may each store only a portion of the total data stored by the Hadoop cluster 112. Each node 114*a-d* can access only whatever additional data is needed to carry out operations with respect to its portion of data, and need not access other data not needed to carry out those operations. For example, if a node 114*a* is performing an operation that will use both its portion of data and other data from a different data source, then the node accesses only the subset of the other data that is applicable to the operation being performed on its portion of data.

As a practical example, a data processing system may manage a body of data on behalf of a telephone company which has a master list of customers and a database of telephone call records. In this example, a node 114*a* of a cluster 112 may store data 116*a* representing only telephone calls originating or received in the United States, and other nodes 114*b-d* store data 116*b-d* representing telephone calls originating or received in all of the other countries. A relational database 122 separate from the nodes 114*a-d* of the cluster 112 may store data 124 representing a list of the telephone company's customers. (This is only used as an example, as a real-world implementation of a database of telephone calls may require hundreds or thousands of nodes.)

In this example, a data processing operation can be performed at least in part by the nodes 114*a-d* of the Hadoop cluster 112. For example, the operation can be an operation that identifies customers associated with particular telephone calls. The node 114*a* that stores data representing telephone calls originating and received in the United States can be provided data 124*a* representing the customer records for only those customers having telephone service in the United States, and not any data 124*b*, 124*c* representing customers having telephone service in any other countries. In some examples, the data 124*a-c* from the relational database 122 can be provided to the respective nodes 114*a-d* of the Hadoop cluster 112. In some examples, the respective nodes 114*a-d* of the Hadoop cluster can request the portion of data 124*a-c* from the relational database 122. Thus, the amount of data accessed by the node 114*a* is small compared to the entire database of customers, e.g., all of the data 124*a-c* stored by the relational database 122. In some examples, the data 124*a-c* received by a node 114*a-d* may be transformed (e.g., by the node 114*a-d*) to a format compatible with the format of data stored at the node 114*a-d*.

Because only a relatively small amount of data is received from the respective data sources when each operation is performed, the operations can be performed on data stored in active (volatile) memory, as opposed to persistent (non-volatile) storage such as a disk. In many computing environments, this will speed up data processing operations, since persistent storage tends to be slower than active memory.

In some implementations, the data processing system 100 could be a graph-based processing system. A graph-based processing system processes data using dataflow graphs. A dataflow graph is a computer program that contains components representing operations to be performed on input data and links between the components representing flows of data. (Components are sometimes referred to as nodes, but will be called components here to avoid confusion with the nodes of Hadoop clusters.) The operations represented by the components generate output data based on the input data by processing the input data. A component can provide input data to and receive output data from other components if the component is linked to the other components, in which each link between two components represents a flow of data from one of the components to the other component. When the dataflow graph is executed by a graph-based processing system, each of the components is executed, e.g., a computer program or portion of a computer program is executed and carries out the operation represented by the component. During execution the dataflow graph receives input data which is processed (e.g., operated on by the operations of the dataflow graph's components) to generate output data. One example of a graph-based system is described in detail in U.S. Publication No. 2007/0011668, titled "Managing Parameters for Graph-Based Applications," incorporated herein by reference. A system for executing graph-based computations is described in U.S. Pat. No. 5,966,072, titled "Executing Computations Expressed as Graphs," incorporated herein by reference.

The execution of a graph is sometimes facilitated by a specialized operating system, sometimes called a graph operating system. A graph operating system is a computer program capable of executing the operations underlying individual components of a dataflow graph. For example, if a component of a dataflow graph represents an operation to be carried out by a database system, the graph operating system is tasked with instructing a database system to carry out the operation. For this reason, a graph operating system sometimes executes on systems that interact with a graph-based data processing system. In the example shown in FIG. 1, instances of a graph operating system 130a-d may execute on the nodes 114a-d of the Hadoop cluster 112. Examples of techniques for executing a graph operating system on a node of a Hadoop cluster are described in U.S. application Ser. No. 14/090,434, titled "Parallel Access to Data in a Distributed File System," incorporated herein by reference.

A graph operating system 130a-d, or any other general-purpose data processing system, can be used to enable the nodes of the Hadoop cluster 112 to receive data from other data sources. For example, the graph operating system may be capable of receiving data from a relational database 122. In this example, an instance of the graph operating system can receive the data from the relational database 122 and provide it to the appropriate portion or subsystem of the Hadoop node 114a-d on which the instance of the graph operating system is executing. In this way, the nodes 114a-d of the Hadoop cluster do not need any custom functionality (e.g., custom-written code) to receive data from another kind of data source such as a relational database. In some examples, the graph operating system 130a-d has the capability to receive a "plug-in" that describes how to receive and parse data from a particular data source. In the example in which a Hadoop node 114a receives data from a relational database 122, an instance of the graph operating system 130a running on the Hadoop node 114a can access the "plug-in" to determine how to parse the data received from the relational database 122.

In some implementations, the instances of the graph operating system 130a-d that execute on the nodes 114a-d of the Hadoop cluster 112 communicate with functionality of the relational database 122. For example, the relational database 122 may support a function (e.g., a database command) which enables an external entity, such as the graph operating system, to access data stored by the relational database 122.

In some implementations, the data processing system 100 is tasked with carrying out a database query 140. A database query is a set of instructions describing a subset of the database contents and actions to take upon the data in that subset. If the database query 140 were a database query used with the system described above storing data for a telephone company, the database query 140 could be a request for certain records of telephone calls stored in the data sources used by the telephone company. For example, some database systems perform database queries written in a dedicated database query language such as Structured Query Language (SQL). In these database systems, an SQL query is the primary instrument for manipulating the contents of the database.

In some implementations, the database query 140 is an SQL query. SQL queries use commands and syntax defined by the structured query language. The relational database 122 includes a collection of one or more database tables; a database table is a collection of data arranged in a) rows each representing a record and b) columns each representing a category of data stored in the rows. For example, a database table called "current_customers" may have rows each representing a current customer of a business and may have columns representing categories of data such as name of the customer, address of the customer, last product purchased by the customer, and so on.

A relational database 122 typically includes functionality for interpreting a query and returning data responsive to the query. The combination of interpreting a query and returning data responsive to the query is sometimes referred to as executing the query. For example, some relational database implementations include an engine which a) parses a SQL query, b) identifies operations that are defined by the structured query language, c) identifies operands of the operators, and d) carries out (e.g., executes) the operations according to the operands. An example of a SQL query could be "SELECT last_name FROM current_customers." This SQL query includes an operation, SELECT, which instructs a relational database to retrieve data according to the operands of the SELECT operation. In the syntax of SQL, the operands are "current_customers," which is a database table managed by the relational database, and "last_name," which is a column of the database table. When the relational database interprets the query and executes the operations of the query, the relational database will return the data of the last_name column (e.g., each portion of data contained in the last_name column) in response to the query.

The data processing system 100 can carry out the database query 140 even if data sources identified in the database query 140 are not databases that operate using queries in the form of the database query 140. For example, the Hadoop cluster 112 may not usually accept instructions specified in the form of SQL. If the database query 140 is a SQL query and references the Hadoop cluster 112 then the instances of the graph operating system 130a-d can together act as an intermediary which takes in the database query 140 and each instance can determine what operations should be performed, in response, at the Hadoop cluster 112. For example, components of a dataflow graph can be substituted for instructions of a database query 140. Techniques in accordance with this substitution are further described in U.S. Publication No. 2012/0284255A1, titled "Managing Data Queries," incorporated herein by reference. In some implementations, a dataflow graph can be produced from a database query 140.

In some implementations, each instance of the graph operating system 130a-d executes a corresponding portion of a computer program 134a-d. For example, the computer program may be made up of executable components, and each instance of the graph operating system 130a-d can execute some of the components of the computer program. The instances of the graph operating system 130a-d can coordinate with one another, for example, by transmitting and receiving data to and from one another, to execute their respective portions of the computer program and thus together execute the computer program. In some examples, multiple instances of the graph operating system 130a-d execute instances of the same components of the computer program. For example, the instances of the computer program 134a-d executing on the nodes 114a-d of the Hadoop cluster 112 may each execute instances of the same data processing component, each of which operates on different data (e.g., the data 116a-d stored by the respective node 114a-d). In some examples, the portions of the computer program may together make up a dataflow graph, and the portions of the computer program may be subgraphs (e.g., one or more linked components) of the dataflow graph. In some implementations, an instance of the graph operating system 130a-d can generate the computer program 134a-d.

In this way, the Hadoop cluster can carry out operations of the database query 140 (sometimes referred to as executing the database query 140) using techniques that do not rely on functionality of a relational database, e.g., query interpretation functionality of a relational database, to carry out the operations. Instead, the query can be carried out by executing the instances of the computer program 134a-d. Once the computer program 134a-d is generated, no query interpretation functionality of a relational database is used to carry out the operations of the database query 140 on the nodes 114a-d of the Hadoop cluster.

In some implementations, a computer program (e.g., a dataflow graph, or any other kind of program) can be configured with parameters. For example, the parameters may be values that can be changed to change the behavior of the program. As a specific example, a parameter may be "filename" and the value of the parameter could be the location of a file in a file system. The value of the parameter can be changed to a location of a different file to configure the program to access the different file. Two instances of the same program can be configured with different parameter values, which will change the behavior of the two instances of the same program.

The systems in FIG. 1 can communicate with each other using one or more networks. For example, the nodes 114a-d of the Hadoop cluster 112 can communicate with one another using a network such as a local area network (LAN) but may communicate with each other using a wide area network (WAN), the Internet, or another kind of network. Further, the nodes 114a-d of the Hadoop cluster 112 may communicate with the relational database 122 and the processing system 100 using a LAN, WAN, the Internet, or any other kind of communications network that supports communications between computer systems.

Further, although a single Hadoop cluster 112 is shown in FIG. 1, multiple Hadoop clusters could be used in the system shown in the figure. For example, one Hadoop cluster could receive some data from the relational database 122, and another Hadoop cluster could receive other data from the relational database 122. Other configurations involving multiple Hadoop clusters are possible.

Figure 2:
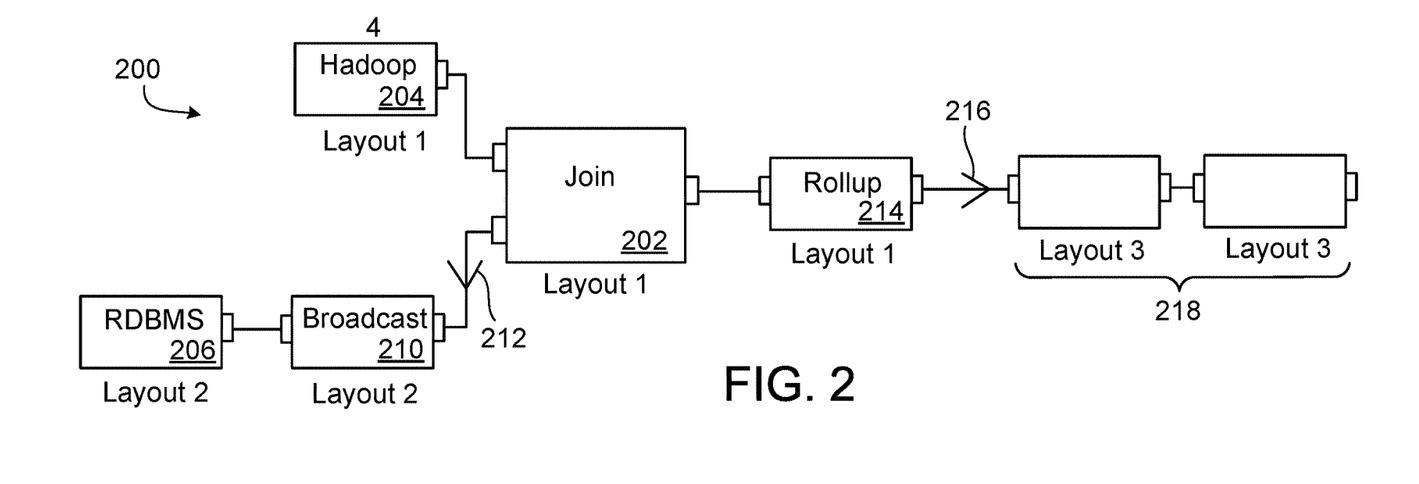
FIGS. 2 and 3 show dataflow graphs.

FIG. 2 shows an example of a dataflow graph 200. In some examples, the dataflow graph 200 could be displayed in a user interface that allows a dataflow graph to be viewed, configured, and/or executed. This dataflow graph 200 represents a data processing operation that might be performed by the Hadoop cluster 112 and the data processing system 100 shown in FIG. 1. In this example, the dataflow graph contains a component 202 representing an operation called "join," which we will also refer to as the join component 202. The "join" operation combines two types of data, for example, one type of data contained in one data source and another type of data contained in another data source. The other components of the dataflow graph 200 enable the dataflow graph 200 to carry out the join operation using multiple types of data sources, including one data source that is a Hadoop cluster. Further, most of the processing occurs on the nodes of the Hadoop cluster.

In some examples, the dataflow graph 200 can be produced from a database query, e.g., the database query 140 shown in FIG. 1. For example, the dataflow graph 200 can be generated using an engine (e.g., an instance of a graph operating system 130a-d shown in FIG. 1) that takes a database query as input and produces a dataflow graph as output. In this way, a dataflow graph such as the dataflow graph 200 shown in FIG. 2 can, when executed, produce the same output as the execution of the corresponding database query 140 (FIG. 1). In this way, a database query 140 can be written using a database query language such as SQL. However, the systems carrying out the corresponding data processing operations, e.g., the Hadoop cluster 112, need not be capable of parsing the database query 140. For example, there is no need to provide custom-designed database query parsing functionality to the Hadoop cluster 112. Instead, an instance of a graph operating system 130a-d executing on a Hadoop node 114a-d (FIG. 1) can execute the dataflow graph 200 to perform operations which, in combination, are equivalent to operations of the database query 140 (e.g., achieving the same result as executing the database query 140 in a conventional relational database system). For example, when the dataflow graph 200 is executed by the instances of the graph operating system 130a-d, the output of the dataflow graph 200 is equivalent to output of a system (other than the Hadoop cluster 112) that executes the database query 140 but does not execute the dataflow graph 200. In this way, the dataflow graph 200 is an example of a computer program that corresponds to the database query 140.

The components of the dataflow graph 200 are arranged so that the dataflow graph 200 can process data from more than one type of data source, including a data source representing a Hadoop cluster. One component 204 represents data stored by the Hadoop cluster 112 and another component 206 represents data stored by the relational database 122 both shown in FIG. 1. The Hadoop cluster component 204 is linked to the join component 202 which means that data flows from the Hadoop cluster component 204 to the join component 202, and so the output of the Hadoop cluster component 204 is provided to the join component 202 as input. Further, the Hadoop cluster component 204 represents operations that can be carried out in parallel by the nodes of the Hadoop cluster. For example, when data flows from the Hadoop cluster component 204, multiple portions of data may simultaneously flow from Hadoop cluster nodes, e.g., data that has been processed by the nodes. Similarly, an operation performed by the Hadoop cluster component 204 can be performed in the form of multiple simultaneous operations each performed on a Hadoop cluster node. This technique is sometimes referred to as parallel processing. As shown in the figure, the number "4" indicates the number of nodes in the underlying Hadoop cluster and thus the number of ways in which an operation can be divided for parallel processing.

The data flows from the relational database component 206 in a way that the data can be provided directly to individual nodes of a Hadoop cluster. Data flows from the relational database component 206 to a broadcast component 210. The data then flows to the join component 202. In this example, the operations of the join component 202 are carried out on data stored by the nodes of the Hadoop cluster represented by the Hadoop cluster component 204 in order to take advantage of the parallel processing capabilities of the Hadoop cluster.

The broadcast component 210 represents operations which enable the data stored by the relational database to be transmitted to each of the nodes represented by the Hadoop cluster component 204. Although the example here uses a relational database, the broadcast component 210, like other components shown in FIG. 2, can be used with other kinds of data sources. In some implementations, the broadcast component 210 copies a narrowed hashtable of the each portion of data across the cluster to allow the join operation to be performed locally in each node of the Hadoop cluster. In this way, when data flows from the relational database component 204 to the join component 202, portions of the underlying data 124a-c stored in the relational database 122 shown in FIG. 1 can be directed to a particular node 114a-d of the Hadoop cluster 112. This process is represented by a fan-out indicator 212 which indicates that the data is divided (or "fanned out") for parallel processing. In some examples, the data stored in the respective data sources (e.g., the relational database 122 and Hadoop cluster 112) can be analyzed to determine an optimal manner of dividing the data as it is processed in the dataflow graph 200. In some examples, the instances of the graph operating system 130a-d executing on the nodes 114a-d of the Hadoop cluster can determine an optimal manner of dividing the data as it is processed in the dataflow graph 200 and request a portion of data from the relational database 122. In general, the data is divided so that the Hadoop nodes each receive a quantity of data (e.g., only some of the rows and/or columns of the relational database) that can be stored in active memory of the respective Hadoop node.

In this example, data flows from the join component 202 to a rollup component 214. A rollup component aggregates data from multiple sources. Because the join component 202 represents operations carried out by multiple nodes of a Hadoop cluster, the rollup component 214 aggregates the output from the multiple nodes. A fan-in indicator 216 indicates that, at this point in the dataflow graph 200, the data flowing through the graph in the form of multiple parallel flows is merged into a single flow. Components 218 that appear after the fan-in indicator 216 represent operations which may be carried out by an entity other than nodes of a Hadoop cluster (for example, the data processing subsystem 101 shown in FIG. 5).

Each of the components of the dataflow graph is marked with a layout indicator. A layout refers to a particular system that carries out the operations represented by a component. As shown in the figure, some components are marked with layout 1, some components are marked with layout 2, and some components are marked with layout 3. Here, components marked with layout 1, layout 2, and layout 3 represent operations carried out by instances of the graph operating system 130a-d associated with the Hadoop cluster 112. In some examples, components marked with layout 2 represent operations carried out by the relational database 122 or a graph operating system associated with the relational database 122. In some examples, components marked with layout 3 represent operations carried out by a system other than the Hadoop cluster 112 or the relational database 122, for example, a system such as the data processing subsystem 101 shown in FIG. 5.

Thus, when the dataflow graph 200 is executed, operations of the dataflow graph 200 can be carried out by computer systems associated with a Hadoop cluster so that much of the data processing occurs at the Hadoop nodes. In this way, the parallel processing features of the Hadoop cluster are used. Further, because the amount of data copied to individual Hadoop nodes can be retained in active memory, the data does not need to be copied to disk and so the performance slowdown caused by disk reads/writes is mitigated.

Figure 3:
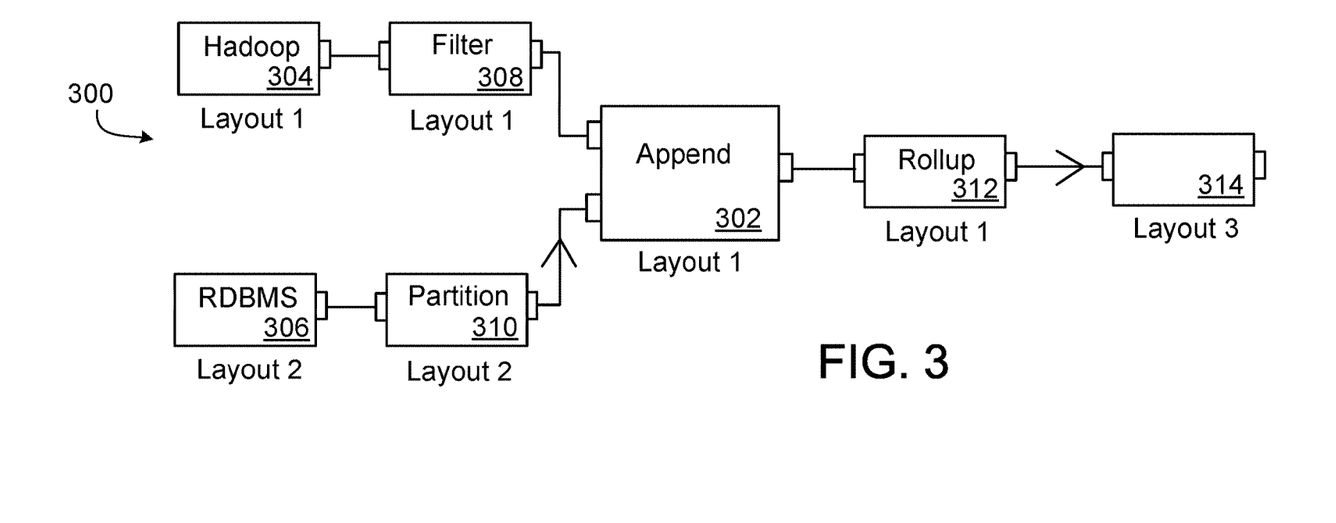

FIG. 3 shows a dataflow graph 300 that represents another series of operations that could be carried out together by systems of the data processing system 100. This dataflow graph 300 includes a component 302 that carries out an "append" operation. An "append" operation appends one quantity of data to another quantity of data, forming a merged quantity of data. This dataflow graph 300 represents another example of a series of processing operations in which most of the data processing occurs on a Hadoop node.

The components of the dataflow graph 300 are arranged so that the dataflow graph 300 can process data from more than one type of data source, including a data source representing a Hadoop cluster. One component 304 represents data stored by the Hadoop cluster 112 and another component 306 represents data stored by the relational database 122 both shown in FIG. 1.

The Hadoop cluster component 304 is linked to a filter component 308 which is linked to the append component 302. Thus, data flows from the Hadoop cluster component 304 and is filtered by the filter component 308 before being processed by the append component 302. The input data can be filtered based on characteristics of the input data as well as characteristics of the data stored on each Hadoop node. For example, if an operation is to be performed on data representing commercial transactions, and a particular Hadoop node only stores data for transactions totaling greater than ten dollars, then the filter component 308 can be configured (e.g., by modifying parameters controlling the operation of the component) to pass on input data that is relevant to purchases totaling greater than ten dollars. As another example, if an operation is to be performed on data representing commercial transactions, and the operation itself is only relevant to purchases totaling greater than ten dollars, then the filter component 308 can be configured (e.g., by modifying parameters controlling the operation of the component) to pass on input data that is relevant to transactions totaling greater than ten dollars.

In this dataflow graph 300, data flowing from the relational database component 306 is divided for processing at nodes of a Hadoop cluster. The relational database component 306 is linked to a partition component 310, which partitions (e.g., divides) the data that flows from the relational database component 306. For example, the partition component 310 may use a technique called round robin, in which each new portion of data partitioned by the partition component 310 is provided to a node of a Hadoop cluster in a fixed sequence. Put another way, in the round robin technique, a portion of data is parceled out to one node after another in turn. In this way, each node of the Hadoop cluster receives portions of data that can be kept in active memory of the node and need not be written to disk.

Thus, the append component 302 represents operations carried out by nodes of a Hadoop cluster, such that each node appends data received from the relational database component 306 to data stored at the individual node of the Hadoop cluster. The results of all of these append operations are provided in parallel to a rollup component 312 which aggregates the results for further processing. For example, the aggregated output can be processed by a further component 314. Again, most of the data processing operations occur on the Hadoop cluster, in a manner that does not require significant use of disk operations on nodes of the Hadoop cluster.

Figure 4:
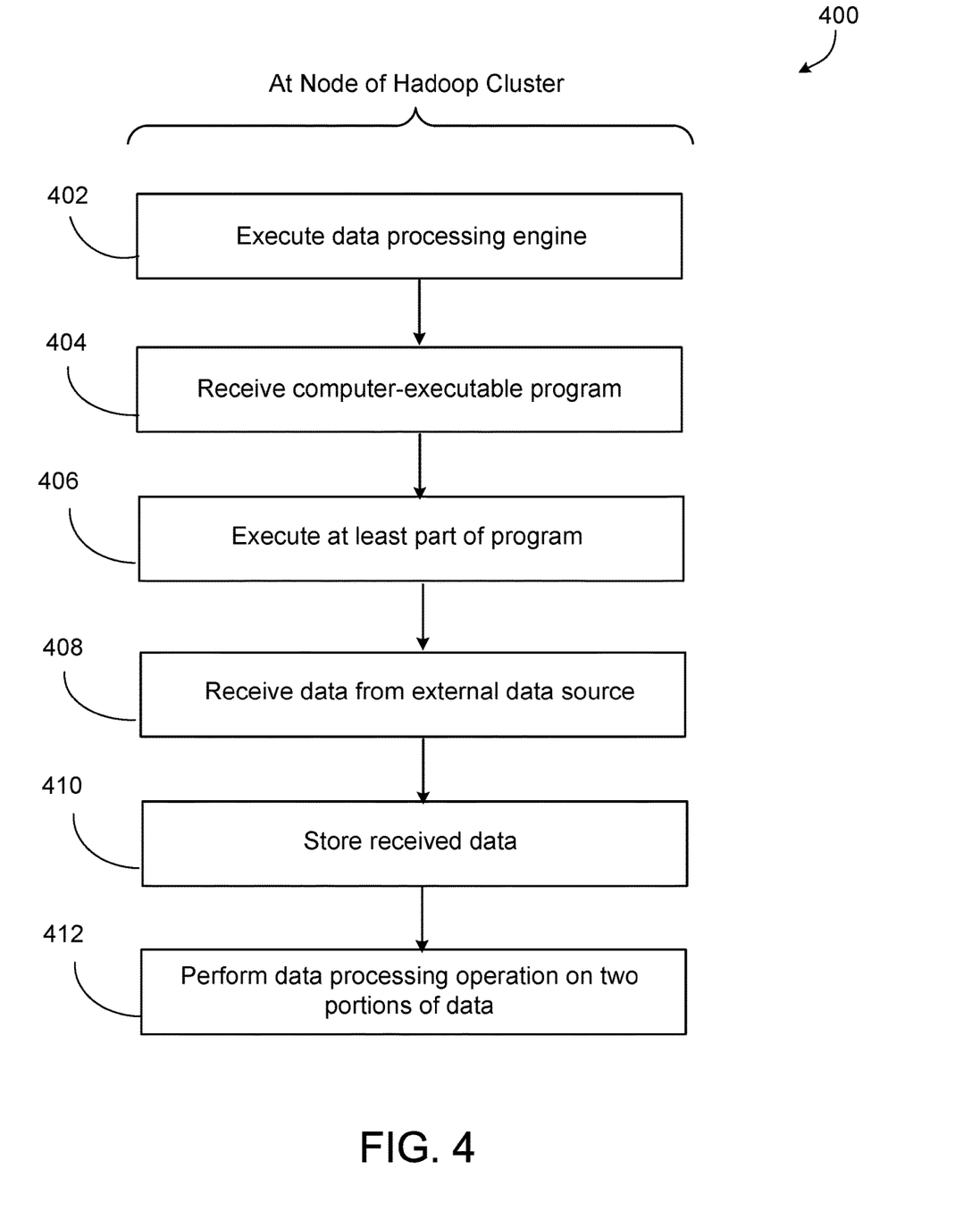
FIG. 4 is a flowchart of a data processing procedure.

FIG. 4 shows a flowchart representing a procedure 400 for processing data. The procedure 400 can be carried out, for example, by components of the data processing system 100 shown in FIG. 1.

The procedure 400 executes 402 an instance of a data processing engine at a Hadoop node of a Hadoop cluster. The Hadoop node stores a first portion of data in HDFS data storage. The data processing engine is capable of receiving data from a data source external to the Hadoop cluster. For example, the node could be one of the nodes 114a-d of the Hadoop cluster 112 shown in FIG. 1. For example, the data processing engine could be the graph operating system 130a-f shown in FIG. 1.

Other instances of the data processing engine can execute on other nodes of the Hadoop cluster, each performing their own instance of operations of the procedure 400 (e.g., operations 402-412). In some implementations, the data processing engine does not implement the MapReduce programming model.

The procedure 400 receives 404 a program. The program can be received by the data processing engine. For example, the program could be a dataflow graph that includes at least one component representing the Hadoop cluster, at least one component representing a source of received data, and at least one link that represents at least one dataflow associated with an operation to be performed on data received from at least one source of data (e.g., the Hadoop cluster or another source of data). The graph may include at least one component connected to a link representing a flow of data from the Hadoop cluster and connected to a link representing a flow of data from a source of the data received in the procedure 400.

In some implementations, the computer program includes components representing operations corresponding to a database query, e.g., an SQL query. A computer program representing a database query includes at least one component representing a source of data referenced in the database query (e.g., a database query referencing the Hadoop cluster) and at least one link that represents at least one dataflow associated with the operation to be performed on the data. For example, the operation could be a data processing operation performed in the procedure 400.

The procedure 400 executes 406 at least part of the computer program. For example, the part of the computer program can be executed by the data processing engine, which executes on the Hadoop node in the Hadoop cluster. In some examples, the part of the computer program executed includes at least one component representing the Hadoop cluster and at least one component representing a data processing operation. For example, the components of the computer program executed 406 could be included in a layout of the computer program. In some examples, instances of the same components of the computer program executed 406 here are concurrently executed in other nodes of the Hadoop cluster. In some implementations, the computer program is configured before it is executed. For example, components of the computer program can be configured with parameters having values that can be changed. In some examples, the computer program is linked to another program or programs. For example, if the computer program is a graph, the graph can be linked to another graph (e.g., a graph executing on or available at a graph operating system).

The procedure 400 receives 408 a second portion of data from the external data source. For example, the external data source can be a source other than a node of the Hadoop cluster, e.g., the data source 120 (e.g., a relational database 122) shown in FIG. 1. The data that is received is distinct from other portions of data received at other nodes of the Hadoop cluster (e.g., other portions of data received from the other source of data). In some examples, the second portion of data includes a subset of rows of a relational database, and the second portion of data includes a subset of columns of the relational database. In some examples, the second portion of data is distinct from a third portion of data received at a second node of the Hadoop cluster from the external data source. Put another way, the second portion of data contains different data, e.g., different rows and/or columns, than the third portion of data.

The procedure 400 stores 410 the second portion of data, other than in HDFS storage, by which we mean that the second portion of data is not stored in HDFS storage (e.g., the HDFS storage containing the first portion of data). For example, the second portion of data can be stored in volatile memory of the Hadoop node. Volatile memory is sometimes referred to as random access memory. In contrast, non-volatile memory is, e.g., a disk drive. The data received 408 by the procedure 400 may have a size that fits in the volatile memory of the nodes of the Hadoop cluster.

The procedure 400 performs 412 a data processing operation identified by the program using at least the first portion of data and the second portion of data. The data processing operation can be carried out, at least in part, by an instance of a data processing engine that co-operates with other instances of the data processing engine. The instances of the data processing engine perform the data processing operation together in parallel, by which we mean that the instances of the data processing engine execute concurrently to perform the same data processing operation on different portions of data. By "execute concurrently," we mean that the time at which one instance of data processing engine begins to carry out a collection of operations (e.g., in a portion of a computer program) does not depend on the time at which another instance of the data processing engine begins to carry out the same collection of operations, and at least some of the same operations may be carried out simultaneously, or within a few milliseconds of each other, on both instances of the data processing engine. In some examples, the instances can together perform the data processing operation on a body of data stored by nodes of the Hadoop cluster, and another body of data. In some examples the other body of data could be stored in a format native to a relational database system (e.g., in the form of a table containing rows and columns, or in another form that is a default format of a relational database system).

In some examples, the procedure 400 executes at least part of the program by a second instance of the data processing engine outside of the Hadoop cluster. For example, the data processing engine could be the graph operating system 130f executing on the other data source 120 (e.g., a relational database 122) shown in FIG. 1. A double-headed arrow is shown in the figure as a representation of communication between the instance of the graph processing engine executing on the Hadoop node and the instance of the data processing engine executing outside the Hadoop cluster. In some implementations, a node of the Hadoop cluster, e.g., one that carries out operations 402-412 of the procedure, communicates with at least part of the program being executed by the second instance of the data processing engine outside of the Hadoop cluster (e.g., the instance of the data processing engine executing on the other data source 120). For example, at least part of the program (e.g., one or more components of a program) may send and receive data to and from the node of the Hadoop cluster.

The portion of data received by a node of the Hadoop cluster could be chosen based on characteristics of the portion of data stored on the node. For example, the portion of data received by the node could be chosen based on what data would be needed to carry out the data processing operation on that particular node, as opposed to other nodes. If the portion of data received by the node comes from a relational database, then the portion of data may include only some columns and/or only some rows from the relational database. In some examples the relational database could perform a filtering operation that filters output data destined for a particular node based on information identifying the portion of data stored on the particular node.

Figure 5:
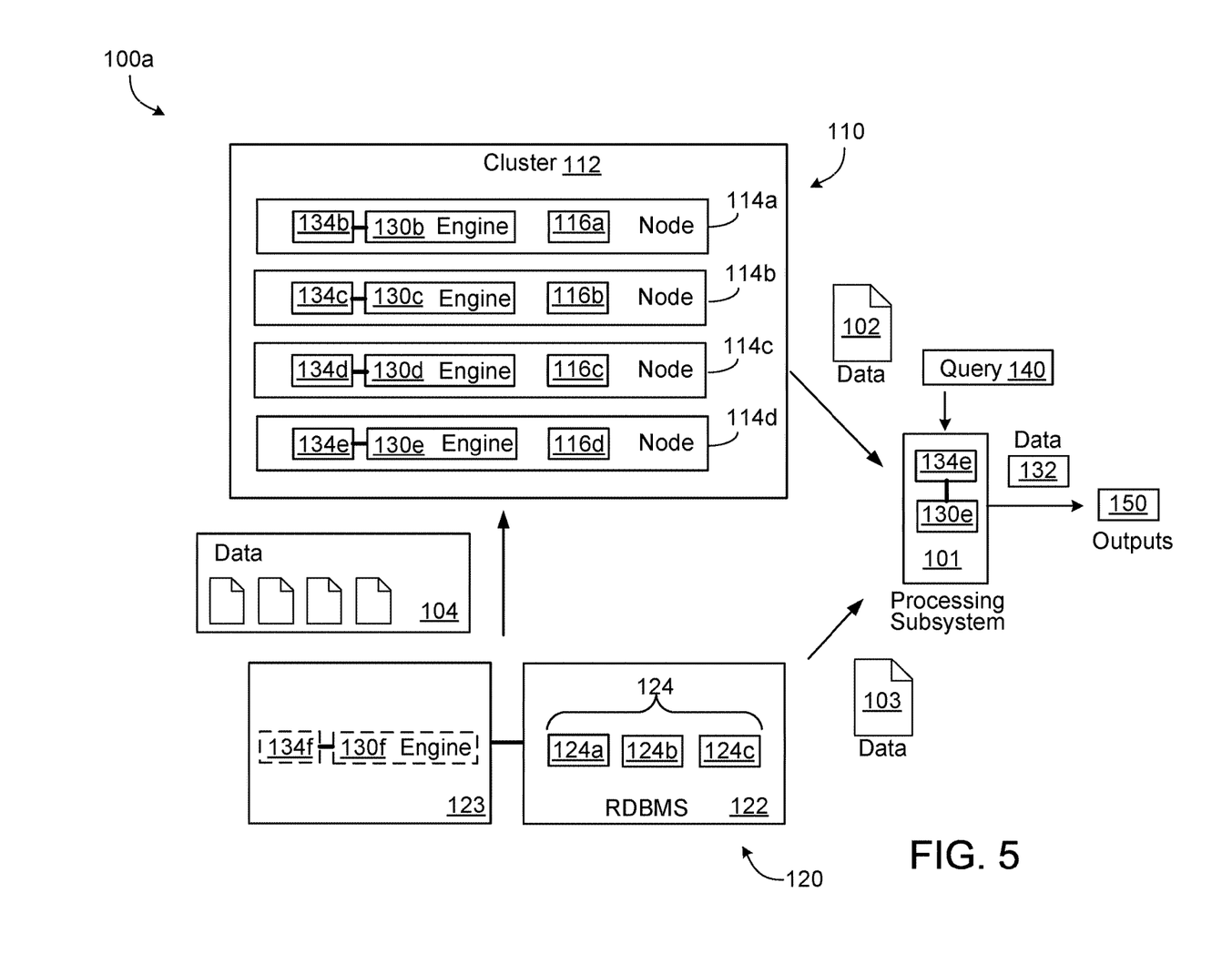
FIG. 5 shows a data processing system.

FIG. 5 shows another version of a data processing system 100a in which data 102, 103 originating at one or more data sources 110, 120, is processed by a data processing subsystem 101. The data processing subsystem 101 performs operations 131 on the data, and provides processed data 132 to one or more outputs 150. This data processing system 101 can process data 102, 103 from more than one type of data source 110, 120, and process the data in a way so that the operations performed on the data are not limited according to which data 102, 103 arrived from which type of data source 110, 120. One manner for accomplishing this is enabling one of the data sources 110 (e.g., a Hadoop cluster 112) to receive data 104 from the other data source 120 (e.g., a relational database 122) and process the received data 104 using techniques native to the data source 110. In this way, much of the data processing that would otherwise be performed by the data processing system 101 is instead performed by the data source 110.

A Hadoop cluster 112, along with other types of data sources, may be designated as an input data source 110 to the data processing system 101. The other data sources 120 could be data sources such as a relational database, a flat file, a feed of data from a network resource, or any other resource that can provide data in response to a request from the data processing system. The data processing subsystem 101 can then perform operations on combinations of data 102 from the Hadoop cluster 112 and data 103 from another data source 120. Rather than extract data from the Hadoop cluster 112 or the other data source 120, the data processing subsystem 101 may rely on the data processing functionality of the Hadoop cluster 112. This could be done to take advantage of data processing features of the Hadoop cluster 112. In this way, the data processing subsystem 101 can carry out fewer operations, and on a much smaller amount of data, compared to the Hadoop cluster 112. For example, as shown in FIG. 5, most of the data 104 received from the other data source 120 is transmitted directly to the Hadoop cluster 112 (e.g., using techniques described above with respect to FIG. 1), and only a small amount of data 103 (perhaps none at all) is transmitted to the data processing subsystem 101.

As a practical example, the data processing subsystem 101 can instruct the nodes 114a-d of the Hadoop cluster 112 to perform some operations (e.g., operations that perform a transformation upon a portion of data) needed to complete a task, and instruct the relational database 122 to carry out some other operations (e.g., operations that perform a transformation upon another portion of data) also needed to complete the task.

As an example of these techniques, when the data processing subsystem 101 performs a data processing operation, the data processing subsystem 101 accesses only the data it needs to carry out the operation, e.g., only the data on which the operation is performed. Other data processing operations can be carried at the Hadoop cluster 112, for example.

In some implementations, the data processing subsystem 101 is a graph-based data processing system which executes graphs to process data. For example, the data processing subsystem 101 may include an instance of a graph operating system 130e, which executes one or more computer programs 134e that include data processing operations.

In some implementations, a further instance of the graph operating system 130f may execute in association with the relational database 122. For example, the further instance of the graph operating system 130f may execute on the same computer system (or combination of systems) that is executing the relational database 122, or the further instance of the graph operating system 130f may execute on a separate computer system 123 in communication with the computer system (or combination of systems) that is executing the relational database 122. In some implementations, the further instance of the graph operating system 130f is not used. Because this instance of the graph operating system 130f is optional, it is represented in FIG. 1 with a dotted line. In some implementations, instances of the graph operating system 130a-d that execute on the nodes 114a-d of the Hadoop cluster 112 communicate with the further instance of the graph operating system 130f executing in association with the relational database 122.

In some implementations, each instance of the graph operating system 130a-f executes a corresponding portion of a computer program 134a-f. For example, the computer program may be made up of executable components, and each instance of the graph operating system 130a-f can execute some of the components of the computer program. The instances of the graph operating system 130a-f can coordinate with one another, for example, by transmitting and receiving data to and from one another, to execute their respective portions of the computer program and thus together execute the computer program. In some examples, multiple instances of the graph operating system 130a-f execute instances of the same components of the computer program. For example, the instances of the computer program 130a-d executing on the nodes 114a-d of the Hadoop cluster 112 may each execute instances of the same data processing component, each of which operates on different data (e.g., the data 116a-d stored by the respective node 114a-d). In some examples, the portions of the computer program may together make up a dataflow graph, and the portions of the computer program may be subgraphs (e.g., one or more linked components) of the dataflow graph. In some examples, the computer program or portions of the computer program executed by the instances of the graph operating system 130a-f is generated from a database query 140 received by the data processing subsystem 101 or received by another component of the data processing system 100a. The approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system (such as a storage device) where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a storage device (e.g., a non-transitory storage device such as solid state memory or media, or magnetic or optical media) readable by a general or special purpose programmable computer, for configuring and operating the computer when the storage device is read by the computer system to perform the procedures described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

For example, although the above examples show a data processing system 100 distinct from the Hadoop cluster 112 or the relational database 122, in some implementations, the data processing system 100 may actually be functionally distributed across the Hadoop cluster 112 and/or the relational database 122, for example, as instances of the graph operating system 130a-e.

As another example, although the examples shown in FIGS. 1-4 use the example of a single Hadoop cluster an a single relational database, the techniques described here could also be used to operate on data received from one Hadoop cluster and received from another separate Hadoop cluster.

What is claimed is:

1. A method including:
   at a node of a cluster that stores a collection of data that can be operated on in parallel by nodes operating in conjunction with one another to carry out data processing operations on the collection of data, the node storing a first portion of data of the collection of data, the first portion of data stored in HDFS data storage:
   executing a first instance of a data processing engine capable of accessing the first portion of data stored in HDFS data storage and receiving data from a data source external to the cluster;
   receiving a computer program by the data processing engine, the computer program configured for accessing the first portion of data stored in HDFS data storage and including a) at least one component representing the cluster, b) at least one component representing the data source external to the cluster, and c) at least one link that represents at least one dataflow associated with a data processing operation;
   executing at least part of the computer program by the first instance of the data processing engine;
   accessing, by the data processing engine, the first portion of data stored in HDFS data storage;
   receiving, by the data processing engine, a second portion of data from the external data source; and
   performing, by the data processing engine, the data processing operation using at least the first portion of data stored in HDFS data storage and the second portion of data from the external data source.

2. The method of claim 1 in which the nodes each execute an instance of the data processing engine, the instances of the data processing engine running concurrently to perform the data processing operation together in parallel.

3. The method of claim 2 in which the data processing operation is performed on a) a first body of data that includes the first portion of data, the first body of data also including other portions of data being processed by the other nodes of the cluster, and b) a second body of data that includes the second portion of data, the second body of data being stored in a format native to a relational database system, and the second body of data being divided into portions that each can be stored in volatile memory of the nodes of the cluster.

4. The method of claim 1 in which at least one component of the computer program is connected to a link representing a flow of data from the cluster, and in which the at least one component is connected to a link representing a flow of data from the source of the second portion of data.

5. The method of claim 1 in which at least some data of the collection of data is stored redundantly in multiple nodes.

6. The method of claim 1 in which the second portion of data is stored in volatile memory of the node.

7. The method of claim 1 including
   receiving a database query, the database query including at least one operation to be performed on data received from at least one source of data that includes the cluster; and
   the computer program including components representing operations corresponding to the database query, in which the computer program includes at least one component representing the at least one source of data and at least one link that represents at least one dataflow associated with the operation to be performed on data received from at least one source of data.

8. The method of claim 1 in which the second portion of data is chosen based on characteristics of the first portion of data.

9. The method of claim 1 in which the second portion of data includes a subset of rows of a relational database, and the second portion of data includes a subset of columns of the relational database.

10. The method of claim 1 in which the second portion of data is distinct from a third portion of data received from the external data source at another node of the cluster.

11. The method of claim 1 including communicating with an instance of at least part of the computer program that is being executed by a second instance of the data processing engine that is outside of the cluster.

12. The method of claim 1 including executing at least part of the computer program by a second instance of the data processing engine outside of the cluster.

13. A non-transitory computer-readable medium including instructions for causing a node of a cluster to carry out operations, the cluster storing a collection of data that can be operated on in parallel by nodes operating in conjunction with one another to carry out data processing operations on the collection of data, the node storing a first portion of data of the collection of data, the first portion of data stored in HDFS data storage, the operations including:
    executing a first instance of a data processing engine capable of accessing the first portion of data stored in HDFS data storage and receiving data from a data source external to the cluster;
    receiving a computer program by the data processing engine, the computer program configured for accessing the first portion of data stored in HDFS data storage and including a) at least one component representing the cluster, b) at least one component representing the data source external to the cluster, and c) at least one link that represents at least one dataflow associated with a data processing operation;
    executing at least part of the computer program by the first instance of the data processing engine;
    accessing, by the data processing engine, the first portion of data stored in HDFS data storage;
    receiving, by the data processing engine, a second portion of data from the external data source; and
    performing, by the data processing engine, the data processing operation using at least the first portion of data stored in HDFS data storage and the second portion of data from the external data source.

14. A node of a cluster that stores a collection of data that can be operated on in parallel by nodes operating in conjunction with one another to carry out data processing operations on the collection of data, the node storing a first portion of data of the collection of data, the first portion of data stored in HDFS data storage, the node including a computer processing device configured to carry out operations including:
    executing a first instance of a data processing engine capable of accessing the first portion of data stored in HDFS data storage and receiving data from a data source external to the cluster;
    receiving a computer program by the data processing engine, the computer program configured for accessing the first portion of data stored in HDFS data storage and including a) at least one component representing the cluster, b) at least one component representing the data source external to the cluster, and c) at least one link that represents at least one dataflow associated with a data processing operation;
    executing at least part of the computer program by the first instance of the data processing engine;
    accessing, by the data processing engine, the first portion of data stored in HDFS data storage;
    receiving, by the data processing engine, a second portion of data from the external data source; and
    performing, by the data processing engine, the data processing operation using at least the first portion of data stored in HDFS data storage and the second portion of data from the external data source.

15. A node of a cluster that stores a collection of data that can be operated on in parallel by nodes operating in conjunction with one another to carry out data processing operations on the collection of data, the node storing a first portion of data of the collection of data, the first portion of data stored in HDFS data storage, the node including:
    means for executing a first instance of a data processing engine capable of accessing the first portion of data stored in HDFS data storage and receiving data from a data source external to the cluster;
    means for receiving a computer program by the data processing engine, the computer program configured for accessing the first portion of data stored in HDFS data storage and including a) at least one component representing the cluster, b) at least one component representing the data source external to the cluster, and c) at least one link that represents at least one dataflow associated with a data processing operation;
    means for executing at least part of the computer program by the first instance of the data processing engine;
    means for accessing, by the data processing engine, the first portion of data stored in HDFS data storage;
    means for receiving, by the data processing engine, a second portion of data from the external data source; and
    means for performing, by the data processing engine, the data processing operation using at least the first portion of data stored in HDFS data storage and the second portion of data from the external data source.

* * * * *

UNITED STATES PATENT AND TRADEMARK OFFICE
CERTIFICATE OF CORRECTION

PATENT NO. : 11,403,308 B2
APPLICATION NO. : 16/865975
DATED : August 2, 2022
INVENTOR(S) : Ian Schechter, Tim Wakeling and Ann M. Wollrath It is certified that error appears in the above-identified patent and that said Letters Patent is hereby corrected as shown below:

On the Title Page

Column 2, Line 1 under "OTHER PUBLICATIONS", delete "non-Microsof" and insert
-- non-Microsoft --

Signed and Sealed this
Thirteenth Day of December, 2022

Katherine Kelly Vidal
*Director of the United States Patent and Trademark Office*